United States Patent Office 3,532,638
Patented Oct. 6, 1970

3,532,638
PHOTOTROPIC COMPOSITIONS
Marshall V. Otis, Kingsport, Tenn., assignor to Eastman Kodak Company, Rochester, N.Y., a corporation of New Jersey
No Drawing. Filed Apr. 28, 1967, Ser. No. 634,503
Int. Cl. F21v 9/00
U.S. Cl. 252—300                                    8 Claims

ABSTRACT OF THE DISCLOSURE

The phototropic compositions of the invention comprise mixtures of (A) a phototrope having the general formula:

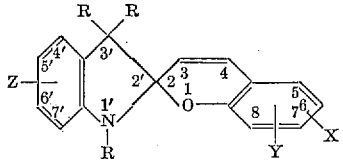

wherein X, Y, and Z are the same or different monovalent radicals selected from the group consisting of hydrogen, carboxyl (—COOH), alkoxy, nitro, hydroxyl, alkoxycarbonyl, cyano, halogen, amino, amido, alkylsulfone, arylsulfone, acyl, and acylamido, in which the hydrocarbyl groups attached to functional moieties containing such have not more than 8 carbon atoms and are, preferably, alkyl radicals of 1 to 4 carbon atoms, at least one of said substituents being other than hydrogen is said phototrope, said substituent Z being located in positions 5' to 7', inclusive, and said substituents X and Y being located at positions 5 to 8, inclusive, and wherein R is a hydrocarbyl radical such as alkyl, cycloalkyl, alkenyl, aryl, alkaryl, and aralkyl, having not more than 8 carbon atoms and, preferably, is an alkyl radical of 1 to 4 carbon atoms; and (B) a cyclic compound having a ureide functional group.

---

The present invention relates to phototropic compositions and, more particularly, to phototropic compositions which retain their color when removed from exposure to a bright light source which contains ultraviolet radiation such as sunlight, but which can also be made to fade by means other than light.

Phototropes or photochromes are compounds or compositions which darken or color as a result of being exposed to sunlight or other sources of bright light containing in its spectrum ultraviolet radiation. When returned to dim light or darkness, phototropes lighten in color. If the darkening and lightening action is sufficiently reversible and can be repeated substantially indefinitely, these compositions are useful in many applications such as protective eyeglasses or goggles, window shades, packaging film, windshields, windows, and the like. A particularly superior class of phototropes having a high degree of reversibility are substituted spirobenzopyranindolines. Such phototropes would, however, have a substantially wider spectrum of utility if the fading of the phototrope could be inhibited so as to retain the color formed on exposure without, however, destroying the ability of returning the phototropes to their original or close to their original colorless state. This type of phototropic composition would find utility in printing, copying and similar applications.

It is, therefore, an object of the present invention to provide novel phototropic compositions.

It is another object of the present invention to provide phototropic compositions which exhibit novel utility in phototropic application.

It is still another object of the present invention to provide phototropic compositions which retain their color when returned to dim light or darkness on exposure to bright light, but which can be made to fade by means other than light.

Other objects and advantages of the present invention will become apparent from the following description and claims.

The phototropic compositions of the present invention comprise mixtures of (A) a phototrope having the general formula:

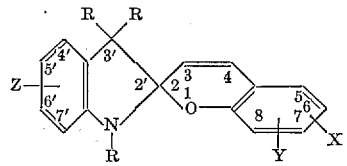

wherein X, Y, and Z are the same or different monovalent radicals selected from the group consisting of hydrogen, carboxyl (—COOH), alkoxy, nitro, hydroxyl, alkoxycarbonyl, cyano, halogen, amino, amido, alkylsulfone, arylsulfone, acyl, and acylamido, in which the hydrocarbyl groups attached to functional moieties containing such have not more than 8 carbon atoms and are, preferably, alkyl radicals of 1 to 4 carbon atoms, at least one of said substituents being other than hydrogen in said phototrope, said substituent Z being located in positions 5' to 7' inclusive, and said substituents X and Y being located at positions 5 to 8, inclusive, and wherein R is a hydrocarbyl radical such as alkyl, cycloalkyl, alkenyl, aryl, alkaryl, and aralkyl, having not more than 8 carbon atoms and, preferably, is an alkyl radical of 1 to 4 carbon atoms; and (B) a cyclic compound having a ureide functional group.

The phototropic composition of the present invention can be employed in the form of solutions in liquid or solid media or can be deposited on solid substrates. Although liquid or solid media containing the phototropic composition may affect the properties of such, e.g. the color, phototropic activity is not eliminated but merely altered. Hence, the medium, although it may be critical in any particular application intended for the phototrope, is not critical insofar as the basic discovery of the present invention is concerned, and the improvements derived from the phototropic compositions of the present invention can be realized in any medium in which the phototrope alone can be employed. The preferred media are resins and, more particularly, thermoplastic resins. Substrates which are suitably coated with the phototropic compositions of the present invention include in particular porous substrates such as paper and woven and nonwoven fabrics.

The present invention is based on the discovery that spirobenzopyranindolines on combination with cyclic compounds having a ureide functional group such as parabanic acid do not lose their ability when exposed to ultraviolet radiation, but that the ability of the phototrope to fade and return to its original colorless state on removal from the radiation source is inhibited so that the phototrope retains its color for a substantial period, such as several days. However, the phototropic composition of the present invention can be made to return to its original colorless state by heating to temperatures of about 100° C. and above. The specific length of time that the color is retained by the phototropic composition in the absence of ultraviolet radiation depends not only on the particular phototrope but also on the environment in which the phototropic composition is employed.

The concentration of the phototrope in its environment can be varied widely and will depend on the utility intended. In general, when employed in a liquid or solid medium a concentration of from 0.001 to 10% by weight of the medium of phototrope will be satisfactory for most applications. For coating applications, in which the phototropic composition is deposited on the substrate even a very low concentration of the phototrope will give rise to some color formation. Generally such substrates are coated by immersing the substrate in or coating the substrate with a solution of the phototropic composition having concentrations of the phototrope in the indicated range. The concentration of the cyclic ureide group containing component can be similarly varied widely and will depend on the particular degree of color retention desired. The molar ratio of cyclic ureide group containing component to phototrope can vary anywhere from 1:10 to 100:1, preferably however the ratio should be 1:1. In general, however, a molar excess of cyclic ureide group containing component over the quantity of phototrope is employed since some of the ureide components have a tendency to sublime. Large excesses of the group containing component do not interfere with the function of the phototrope.

Therefore, if an excess amount is employed and sublimation occurs there remains a sufficient amount of the ureide component to complex with the phototrope. The cyclic ureide group containing components employed in the compositions of the invention are described in the literature. Examples of such components are parabanic acid, uracil, orotic acid, 6-methyluracil, 5-acetyl-6-methyluracil, violuric acid, alloxan, 6-acetamido-1,3-dimethyluracil, 5-ethyl-1-methyl-4-thiouracil, 1,3-diethyl-2-thiobarbituric acid, 5-(N-methylcarbamoyl)-1,6-dimethyluracil, 5-carbethoxy-6-methyluracil, hydrouracil, 6-methyl-2-thiouracil, and the like.

The action of the cyclic compound having a ureide functional group in preventing the fading of the exposed phototrope is believed to be the formation of a hydrogen bonded complex between the colored form of the phototrope and the cyclic compound having a ureide functional group corresponding to the formula:

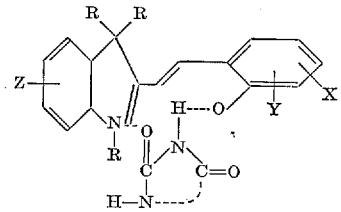

wherein Z, Y and X have the above indicated meaning. As will be apparent from the foregoing formula, the Z, Y, X and R substituents have little effect on the ability of the cyclic ureide group containing functional compound to form the inter-hydrogen bonded complex which is established directly with the nucleus of the molecule. It is postulated that on heating of the complex to temperatures above 100° C. the hydrogen bonds are broken and the phototrope returns to its original form as indicated by the formulas hereinabove.

The spirobenzopyranindolines employed in the compositions of the invention are described in the literature and are generally prepared by the reaction of correspondingly substituted 2-methyleneindolines with correspondingly substituted hydroxybenzaldehydes in the presence of a solvent such as ethanol with or without a catalyst such as piperidine. The initial condensation product of the 2-methyleneindoline is converted to the spirobenzopyranindoline with base. Instead of the 2-methyleneindoline, the corresponding indoleninium salt can be employed. Phototropic spirobenzopyranindolines include:

8-methoxy-5'-methoxycarbonyl-1',3',3'-trimethyl-6-nitrospiro [2H-1-benzopyran-2,2'-indoline], 5'-methoxycarbonyl-1',3',3'-trimethyl-6-nitrospiro [2H-1-benzopyran-2,2'-indoline], 6-methoxy-5'-methoxycarbonyl-1',3',3'-trimethyl-8-nitrospiro [2H-1-benzopyran-2,2'-indoline], 5'-methoxycarbonyl-1',3',3'-trimethyl-7-diethylaminospiro [2H-1-benzopyran-2,2'-indoline], 5'-methoxycarbonyl-1',3',3'-trimethyl-7-hydroxyspiro [2H-1-benzopyran-2,2'-indoline], 5'-methoxycarbonyl-1',3',3'-trimethyl-6-hydroxyspiro [2H-1-benzopyran-2,2'-indoline], 5'-methoxycarbonyl-1',3',3'-trimethyl-8-methoxyspiro [2H-1-benzopyran-2,2'-indoline], 5'-methoxycarbonyl-1',3',3'-trimethyl-8-nitrospiro [2H-1-benzopyran-2,2'-indoline], 5'-methoxycarbonyl-1',3',3'-trimethyl-6,8-dibromospiro [2H-1-benzopyran-2,2'-indoline], 5'-methoxycarbonyl-1',3',3'-trimethyl-6,8-dichlorospiro [2H-1-benzopyran-2,2'-indoline], 5'-methoxycarbonyl-1',3',3'-trimethyl-6,8-dinitrospiro [2H-1-benzopyran-2,2'-indoline], 5'-methoxycarbonyl-1',3',3'-trimethyl-6-bromo-8-nitrospiro [2H-1-benzopyran-2,2'-indoline], 5'-methoxycarbonyl-1',3',3'-trimethyl-6-methoxyspiro [2H-1-benzopyran-2,2'-indoline], 5'-methoxycarbonyl-1',3',3'-trimethyl-6-chlorospiro [2H-1-benzopyran-2,2'-indoline], 5'-methoxycarbonyl-1',3',3'-trimethyl-6-bromospiro [2H-1-benzopyran-2,2'-indoline], 5'-methoxycarbonyl-1',3',3'-trimethyl-6-bromo-8-methoxyspiro [2H-1-benzopyran-2,2'-indoline], 5'-methoxycarbonyl-1',3',3'-trimethyl-6-methoxy-8-bromospiro [2H-1-benzopyran-2,2'-indoline], 5'-methoxycarbonyl-1',3',3'-trimethyl-5-nitro-8-methoxyspiro [2H-1-benzopyran-2,2'-indoline], 5'-methoxycarbonyl-1',3',3'-trimethyl-5,7-dichloro-6-nitrospiro [2H-1-benzopyran-2,2'-indoline], 5'-methoxycarbonyl-1',3',3'-trimethyl-5,6-dinitro-8-methoxyspiro [2H-1-benzopyran-2,2'-indoline], 5'-methoxycarbonyl-1',3',3'-trimethyl-6-nitro-8-fluorospiro [2H-1-benzopyran-2,2'-indoline], 5'-acetyl-1',3',3'-trimethyl-6-nitro-8-bromospiro [2H-1-benzopyran-2,2'-indoline], 5'-methoxycarbonyl-1',3',3'-trimethyl-5-nitro-8-chlorospiro [2H-1-benzopyran-2,2'-indoline], 5'-methoxycarbonyl-1',3',3'-trimethyl-8-hydroxyspiro [2H-1-benzopyran-2,2'-indoline], 5'-methoxycarbonyl-1',3',3'-trimethyl-8-diethylaminospiro [2H-1-benzopyran-2,2'-indoline], 1',3',3'-trimethyl-8-nitrospiro [2H-1-benzopyran-2,2'-indoline], 1',3',3'-trimethyl-6-nitro-5-chlorospiro [2H-1-benzopyran-2,2'-indoline], 1',3',3'-trimethyl-6-nitro-8-chlorospiro [2H-1-benzopyran-2,2'-indoline], 1',3',3'-trimethyl-5-nitro-8-methoxyspiro [2H-1-benzopyran-2,2'-indoline], 1',3',3'-trimethyl-5-6-dinitrospiro [2H-1-benzopyran-2,2'-indoline], 1',3',3'-trimethyl-6-bromo-8-nitrospiro [2H-1-benzopyran-2,2'-indoline], 1',3',3'-trimethyl-6-nitro-8-fluorospiro [2H-1-benzopyran-2,2'-indoline]

1'3',3'-trimethyl-7'-methoxycarbonyl-6-nitrospiro [2H-1-benzopyran-2,2'-indoline], 1',3',3'-trimethyl-6-nitro-8-iodospiro [2H-1-benzopyran-2,2'-indoline], 8-methoxy-1',3',3'-trimethyl-5'-(methylsulfonyl)-6-nitrospiro [2H-1-benzopyran-2,2'-indoline], 6,8-dibromo-1',3',3'-trimethyl-5'-(methylsulfonyl)spiro [2H-1-benzopyran-2,2'-indoline], 8-methoxy-6-methoxycarbonyl-1',3',3'-trimethyl-6'-nitrospiro [2H-1-benzopyran-2,2'-indoline], and 5'-methoxy-1',3',3'-trimethyl-8-nitrospiro [2H-1-benzopyran-2,2'-indoline].

The preferred phototropes are those in which Z is hydrogen or an alkoxycarbonyl radical and X and Y are nitro groups, halogens, or a nitro group in combination with hydrogen, methoxy group, or a halogen.

The phototropic composition of the present invention can be employed in any substantially transparent, inert liquid or solid medium in which the improved phototropic composition is soluble in effective concentrations. Since the phototropic composition is generally employed in very dilute form, solubility is generally not a problem. Liquid solutions of the phototropic composition in volatile solvents are generally employed to deposit the composition on a substrate such as a fabric or paper by dipping, spraying or painting. If desired, a binder such as a resin, can be added to the solution. Suitable organic solvents includes hydrocarbons, halogenated hydrocarbons, alcohols, esters, ketones, ethers and the like. Suitable solid solutions of the phototropic compositions of the present invention are formed in particular in thermoplastic resins which are transparent. Examples of such are cellulose esters such as cellulose butyrate acetate, polyvinylalcohol, polyvinylacetals such as polyvinylbutyral, polystyrene, styrene interpolymers such as styrene acrylonitrile copolymers and acrylonitrile-butadiene-styrene interpolymers, vinyl halide polymers such as polyvinyl chloride, polyacrylate resins such as polymethyl methacrylate, polyolefins such as polyethylene, polypropylene and ethylene acrylate copolymers and polyvinyl esters such as polyvinyl acetate. Praticularly preferred thermoplastic resins are plasticized and unplasticized cellulose ester resins.

Various means heretofore employed for the compounding of additives with thermoplastic resins can also be employed for the phototropic composition of the present invention. Such methods include the solution of resin and phototropic compositions in a common solvent, followed by mixing and evaporation of the solvent, although, preferably, the resin is heated to a sufficiently fluid state above its softening point and then directly admixed with the phototropic composition. Rubber mills, Banbury mixers, and screw extruders are employed in such methods. Care should, of course, be taken that the temperatures employed do not cause the degradation of the components of the mixture. More than one phototrope can be compounded with the parabanic acid using the above-indicated media or media which are mixtures of solvents, thermoplastic resins, or themoplastic resins and solvents.

The present invention is further illustrated by the following examples in which all parts and percentages are by weight unless otherwise stated.

EXAMPLE I

A solution of 100 parts of acetone containing 0.25 part of 5'-methoxycarbonyl-8-methoxy-1',3',3'-trimethyl-6-nitrospiro [2H-1]-benzopyran-2,2'-indoline and 0.25 part of parabanic acid is formed by dissolving the components in the solvent with slight warming and agitation.

A sheet of commercially available bond paper is dip-coated in the solution and the solvent is volatilized by air drying. A typewritten letter on translucent paper is placed as an overlay on the bond paper and the combination is passed through a Bruning Copier, a commercially available copier employing a high intensity ultraviolet light source in which the paper is exposed. The resultant copy has a dark blue background with white areas for the printed copy material. Legibility is retained for several days. On heating a freshly exposed copy to 100° C. the color disappears within minutes.

The foregoing procedure is repeated employing a solution of the phototrope without the parabanic acid. The exposed copy of the bond paper fades rapidly at room temperature so that the printing becomes illegible after short periods of time such as 24 hours.

EXAMPLE II

Using the solution of Example I a piece of finely woven polyester fabric is dip-coated and dried. An overlay of a photographic negative of an engineering drawing is placed on top of the fabric and the combination is sandwiched between glass plates. The composite is then exposed to a high intensity ultraviolet light source such as a Hanovia lamp. The resultant fabric shows a legible copy of the drawing with the background being white and the lines appearing in dark blue. The copy remains legible for several days but the drawing is erased by heating the fabric to 100° C.

EXAMPLE III

An acetone solution of 100 parts acetone, 12 parts of cellulose acetate butyrate (13% acetyl, 38% butyryl), 0.25 part of 5'-methoxycarbonyl-8-methoxy-1',3',3'-trimethyl-6-nitrospiro [2H-1]-benzopyran-2,2'-indoline, and 0.25 part of parabanic acid is prepared.

The solution is employed to form 1 mil films using a Bird film applicator. The acetone is allowed to evaporate. The resultant cellulose acetate butyrate film is sensitive to high intensity ultraviolet irradiation and can be changed to a dark blue color by exposure to such. The color is retained for several days but can be erased by heating to a temperature of 100° C.

EXAMPLE IV

A solution of 100 parts of acetone containing 0.25 part of 5'-methoxycarbonyl-8-methoxy-1',3',3'-trimethyl-6-nitrospiro [2H-1]-benzopyran-2,2'-indoline, and 0.25 part of orotic acid is formed by dissolving the components in the solvent with slight warming and agitation.

A sheet of commercially available bond paper is dip-coated in the solution and the solvent is volatilized by air drying. A typewritten letter on translucent paper is placed as an overlay on the bond paper and the combination is passed through a Bruning Copier, a commercially available copier employing a high intensity ultraviolet light source in which the paper is exposed. The resultant copy has a dark blue background with white areas for the printed copy material. Legibility is retained for several days. On heating a freshly exposed copy to 100° C. the color disappears within minutes.

The foregoing procedure is repeated employing a solution of the phototrope without the orotic acid. The exposed copy of the bond paper fades rapidly at room temperature so that the printing becomes illegible after short periods of time such as 24 hours.

EXAMPLE V

A solution of 100 parts of acetone containing 0.25 part of 5'-methoxycarbonyl-8-methoxy-1',3',3'-trimethyl-6-nitrospiro [2H-1]-benzopyran-2,2'-indoline, and 0.25 part of hydrouracil acid is formed for dissolving the components in the solvent with slight warming and agitation.

A sheet of commercially available bond paper is dip-coated in the solution and the solvent is volatilized by air drying. A typewritten letter on translucent paper is placed as an overlay on the bond paper and the combination is passed through a Bruning Copier, a commercially available copier employing a high intensity ultraviolet light source in which the paper is exposed. The resultant copy has a dark blue background with white areas for the printed copy material. Legibility is retained for several days. On heating a freshly exposed copy to 100° C. the color disappears within minutes.

The foregoing procedure is repeated employing a solution of the phototrope without the hydrouracil acid. The exposed copy of the bond paper fades rapidly at room temperature so that the printing becomes illegible after short periods of time such as 24 hours.

EXAMPLE VI

A solution of 100 parts of acetone containing 0.25 part of 5′-methoxycarbonyl-8-methoxy-1′,3′,3′-trimethyl-6-nitrospiro [2H-1]-benzopyran-2,2′-indoline, and 0.25 part of 5-acetyl-6-methyluracil acid is formed by dissolving the components in the solvent with slight warming and agitation.

A sheet of commercially available bond paper is dip-coated in the solution and the solvent is volatilized by air drying. A typewritten letter on translucent paper is placed as an overlay on the bond paper and the combination is passed through a Bruning Copier, a commercially available copier employing a high intensity ultraviolet light source in which the paper is exposed. The resultant copy has a dark blue background with white areas for the printed copy material. Legibility is retained for several days. On heating a freshly exposed copy to 100° C. the color disappears within minutes.

The foregoing procedure is repeated employing a solution of the phototrope without the 5-acetyl-6-methyluracil acid. The exposed copy of the bond paper fades rapidly at room temperature so that the printing becomes illegible after short periods of time such as 24 hours.

EXAMPLE VII

A solution of 100 parts of acetone containing 0.25 part of 5′-methoxycarbonyl-8-methoxy-1′,3′,3′-trimethyl-6-nitrospiro [2H-1]-benzopyran-2,2′-indoline, and 0.25 part of 6-methyluracil acid is formed by dissolving the components in the solvent with slight warming and agitation.

A sheet of commercially available bond paper is dip-coated in the solution and the solvent is volatilized by air drying. A typewritten letter on translucent paper is placed as an overlay on the bond paper and the combination is passed through a Bruning Copier, a commercially available copier employing a high intensity ultraviolet light source in which the paper is exposed. The resultant copy has a dark blue background with white areas for the printed copy material. Legibility is retained for several days. On heating a freshly exposed copy to 100° C. the color disappears within minutes.

The foregoing procedure is repeated employing a solution of the phototrope without the 6-methyluracil acid. The exposed copy of the bond paper fades rapidly at room temperature so that the printing becomes illegible after short periods of time such as 24 hours.

The foregoing examples have illustrated the effect of cyclic compound having a ureide functional group in retaining the colored form of spirobenzopyranindoline phototropes in various media. Similar retention of color is obtained when other spirobenzopyranindolines falling within the scope of the present invention are substituted for the ones specifically illustrated.

I claim:

1. A phototropic composition comprising a mixture of (A) a phototrope having the general formula:

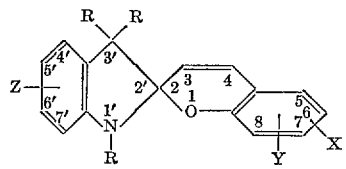

wherein X, Y, and Z are the same or different monovalent radicals selected from the group consisting of hydrogen, carboxyl, alkoxy, nitro, hydroxyl, alkoxycarbonyl, cyano, halogen, amino, amido, alkylsulfone, arylsulfone, acyl, and acylamido, in which the alkyl groups attached to functional moieties containing such have not more than 8 carbon atoms, at least one of said X, Y, Z substituents being other than hydrogen, said substituent Z being located at positions 5′ to 7′, inclusive, and said substituents X and Y being located at positions 5 to 8, inclusive, and wherein R is a hydrocarbyl radical of not more than 8 carbon atoms; and (B) a cyclic compound containing a functional group having the general formula:

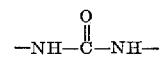

the molar ratio of the cyclic functional group containing compound to phototrope being from about 1:10 to 100:1.

2. The phototrope composition of claim 1 wherein the cyclic functional group is selected from the group consisting of parabanic acid, hydrouracil and 6-methyl-2-thiouracil.

3. The phototrope composition of claim 1 wherein the molar ratio of cyclic ureide group containing component to phototrope is about 1:1.

4. The phototropic composition of claim 1 dissolved in an inert organic solvent selected from the group consisting of halogenated hydrocarbons and ketones.

5. The phototropic composition of claim 1 dissolved in a thermoplastic resin selected from the group consisting of cellulose esters, polyvinylalcohols, polyvinylacetals, polystyrenes, styrene interpolymers, vinyl halide polymers, polyacrylate resins, polyolefins, and polyvinyl esters.

6. The phototropic composition of claim 1 deposited on a substrate selected from the group consisting of paper and fabrics.

7. The phototropic composition of claim 1, wherein in the phototrope R is methyl, Z is hydrogen or an alkoxycarbonyl group and X and Y are nitro groups, halogens, or a nitro group in combination with hydrogen, methoxy group, or a halogen.

8. The phototropic composition of claim 1, wherein the phototrope is 8-methoxy-5′-methoxycarbonyl-1′,3′,3′-trimethyl-6-nitrospiro [2H-1]-benzopyran-2,2′-indoline.

References Cited

UNITED STATES PATENTS 3,290,331   12/1966   Taylor et al. _____ 252—62.1
3,149,120   9/1964   Bermann _____ 252—62.1

GEORGE F. LESMES, Primary Examiner

J. P. BRAMMER, Assistant Examiner

U.S. Cl. X.R.

96—90; 260—326.11